United States Patent [19]

Peters

[11] Patent Number: 5,383,099

[45] Date of Patent: Jan. 17, 1995

[54] PORTABLE PHOTOGRAPHY BOOTH AND IMPROVED LIGHT REFLECTOR ASSEMBLY

[76] Inventor: Larry D. Peters, 314 N. Main St., London, Ohio 43140

[21] Appl. No.: 990,032

[22] Filed: Dec. 14, 1992

[51] Int. Cl.$^6$ .......................................... G03B 15/06
[52] U.S. Cl. ............................ 362/18; 362/277; 362/285; 362/296; 362/413; 362/418
[58] Field of Search ................... 362/3, 8, 11, 12, 16, 362/17, 18, 129, 141, 347, 382, 277, 285, 296, 319, 413, 418; 354/290, 291, 292

[56] References Cited

U.S. PATENT DOCUMENTS

| | | | |
|---|---|---|---|
| 406,299 | 7/1889 | Overpeck | 362/12 |
| 2,750,489 | 6/1956 | Gibson | 362/17 |
| 3,604,913 | 9/1971 | Crete | 362/8 |
| 3,952,322 | 4/1976 | Wolfe | 362/11 |
| 3,970,835 | 7/1976 | Crete | 362/11 |
| 4,460,946 | 7/1984 | Tinz | 362/16 |
| 4,524,405 | 6/1985 | Heard | 362/18 |
| 5,115,384 | 5/1992 | Loth et al. | 362/18 |

Primary Examiner—Stephen F. Husar
Assistant Examiner—Alan B. Cariaso
Attorney, Agent, or Firm—Francis T. Kremblas, Jr.

[57] ABSTRACT

A portable and demountable photography booth including a plurality of vertical and horizontal frame elements releasably fixed to one another to form an open, generally rectangular frame structure having a frontal light source and a forwardly disposed light reflecting surface detachably mounted to the frame elements in a predetermined position selected to provide appropriate facial and upper torso photographs. The reflecting surface is a single continuously curved surface in which the radius of curvature is approximately equal to the distance from the reflecting surface to a designated position of the face of the person to be photographed to align its reflected image adjacent to the curved outer boundary of the iris of the person being photographed.

11 Claims, 3 Drawing Sheets

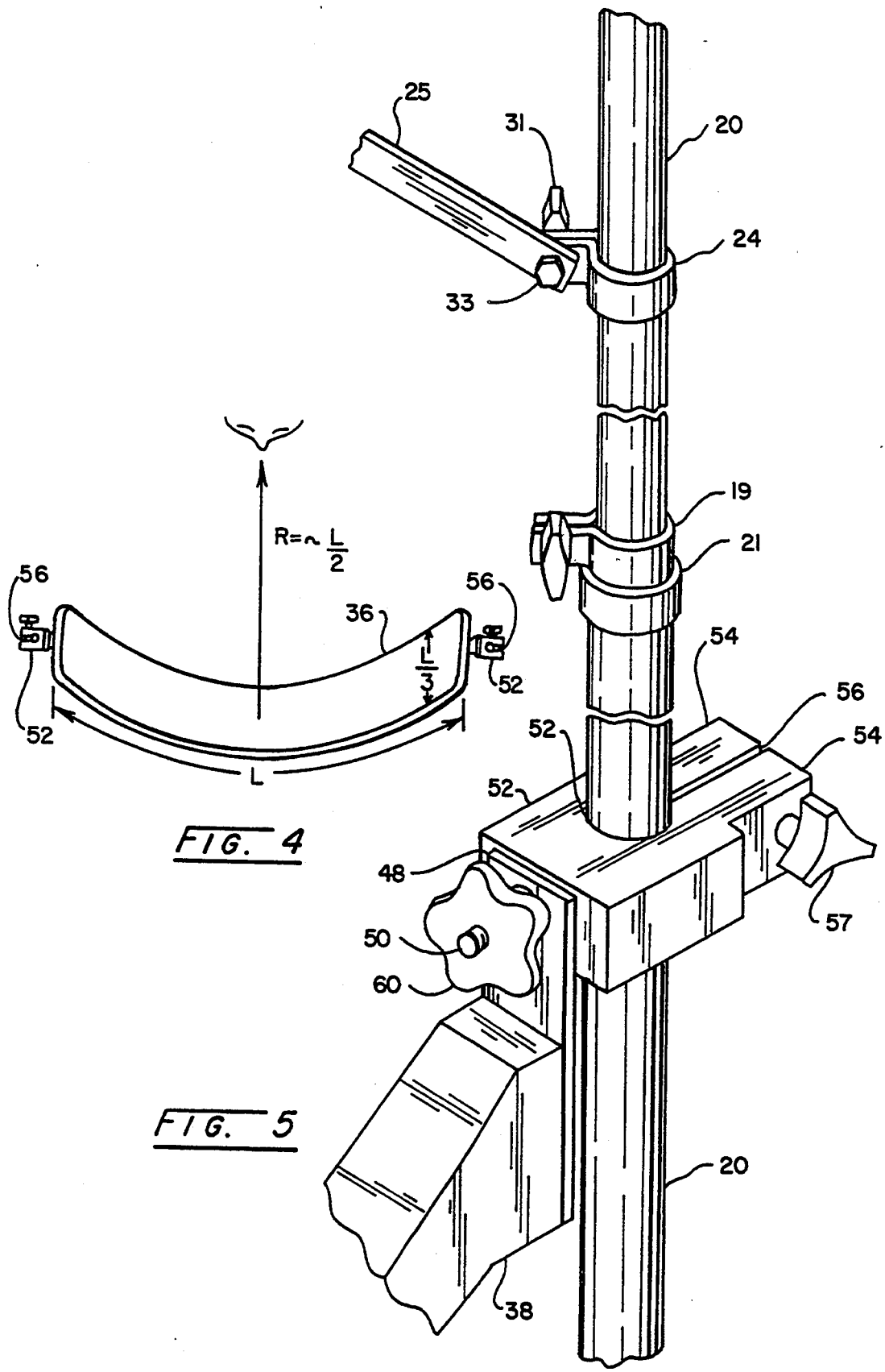

PORTABLE PHOTOGRAPHY BOOTH AND IMPROVED LIGHT REFLECTOR ASSEMBLY

TECHNICAL FIELD

The present invention relates generally to photography lighting accessories and methods of taking photographs and particularly to a lighting and reflector arrangement and method which provides improved photographic results.

BACKGROUND ART

Photography is an old and well-known art in which many advances in cameras for both professional and amateur photographers have been made. However, the taking of high quality upper torso and full face close-up portraits of a human or animal subject has generally been dependent upon the knowledge and skill of a professional or highly skilled amateur having the necessary lighting assemblies typically used in a studio setting.

While there are certain options of lighting arrangements known and used by experience professional photographers to obtain certain highlight effects, the simple upper torso and full face portrait type shot typically requires a good reflected light source from a frontal position relative to the subject being photographed in opposing relationship to the primary light source.

Further, to obtain appropriate lighting one must closely duplicate the arrangement of the necessary primary light source and reflectors typically found only in a professional studio relative to distance between the primary light source, the reflectors used, the subject and the desired background. The knowledge of properly setting up such an arrangement is essentially limited to professional and highly experienced photographers. However, even these professional photographers are often limited to taking such photographs in their studios as it is quite inconvenient and cumbersome to transport the necessary accessories to another setting.

With respect to the conventional reflectors employed, at least one and more typically two or more planar light reflecting surfaces angularly disposed relative to one another, are used for indirect or reflected lighting set ups, particularly for close facial photographs. A single ball-shaped reflected image appears in the eye from the primary light source. However, a long-standing problem with the type of universally used planar or flat reflector is the generally round or ball-shaped reflected image which appears in the subject's eye from each separate, flat reflector surface used in an assembly. Such additional ball-shaped images are undesirable and require touch-up techniques to reduce or eliminate their detracting appearance.

Prior to the present invention, there has been an unfilled need for an indirect lighting assembly which eliminates the prior undesirable or detracting reflected images which appear in the eyes of the subject photographed while still providing appropriate indirect lighting from an opposing direction relative to the primary light source. Further there has been a need for a portable booth assembly which can be conveniently assembled and disassembled for use by both professional and amateur photographers which enhances the taking of good quality photographs.

BRIEF DISCLOSURE OF INVENTION

The present invention relates generally to photography accessories and particularly to a novel light reflector assembly and a portable, demountable photography booth having appropriate mounting means for correctly mounting and positioning lighting accessories and a suitable background for taking high quality close-up photographs.

In accordance with the present invention, the portable booth includes a demountable frame provided with mounting means adapted to detachably receive lighting and reflector accessories in a predetermined position related to the subject to make taking high quality close-up photographs easier for the professional and particularly for amateur photographers.

The demountable frame elements are removably attachable to one another to form an open frame, generally rectangular structure defining a selected area. Light and reflector mounting means are provided on the frame elements at selected positions related to the desired position of the subject within the open frame and a detachably mounted background is preferably included in the assembly.

A novel, curved light reflector is provided and is detachably mounted in a position relative to the light source facing the subject to provide an improved lighting effect in the photographic result. One improved result in the photograph is the elimination of the typical concentrated, ball-shaped reflections present in the eye of the subject when conventional flat or planar reflecting surfaces are used and which typically requires professional touch-up procedures to eliminate from the photograph.

Another advantage is that the curved reflector can be configured to provide reflected light directed more uniformly over the subject's face than a multiple arrangement of flat reflectors.

The curved or arcuate reflector assembly can be incorporated into the booth assembly and preferably comprises a flexible material which can be transported in a flat condition, but easily assumes the desired arcuate shape when mounted in an appropriate frame. The arc of the reflector has a radius related to the distance to the subject's face for proper alignment and elimination of the undesirable reflections which appear in the subject's eye.

Therefore it is a primary object of the present invention to provide a demountable photography booth for relatively easy transport and erection which provides the accessories and conditions typically available only in a professional studio arrangement for high quality close-up facial photographs.

It is another object of the present invention to provide a novel, improved photography light reflector assembly which defines an arcuate segment having a radius related to the distance between the reflector surface and the subject's face to provide improved photographic results.

BRIEF DESCRIPTION OF DRAWINGS

FIG. 4 is a top plan view illustrating the curved reflector assembly apart from the booth assembly with a diagrammatic representation of the subject's face located a preferred distance from the surface of the reflector;

FIG. 5 is a partial perspective view of the booth assembly shown in FIG. 1 illustrating assembly details of a preferred embodiment for attaching the curved reflector and a portion of the frame elements;

DETAILED DESCRIPTION

Figure 1:
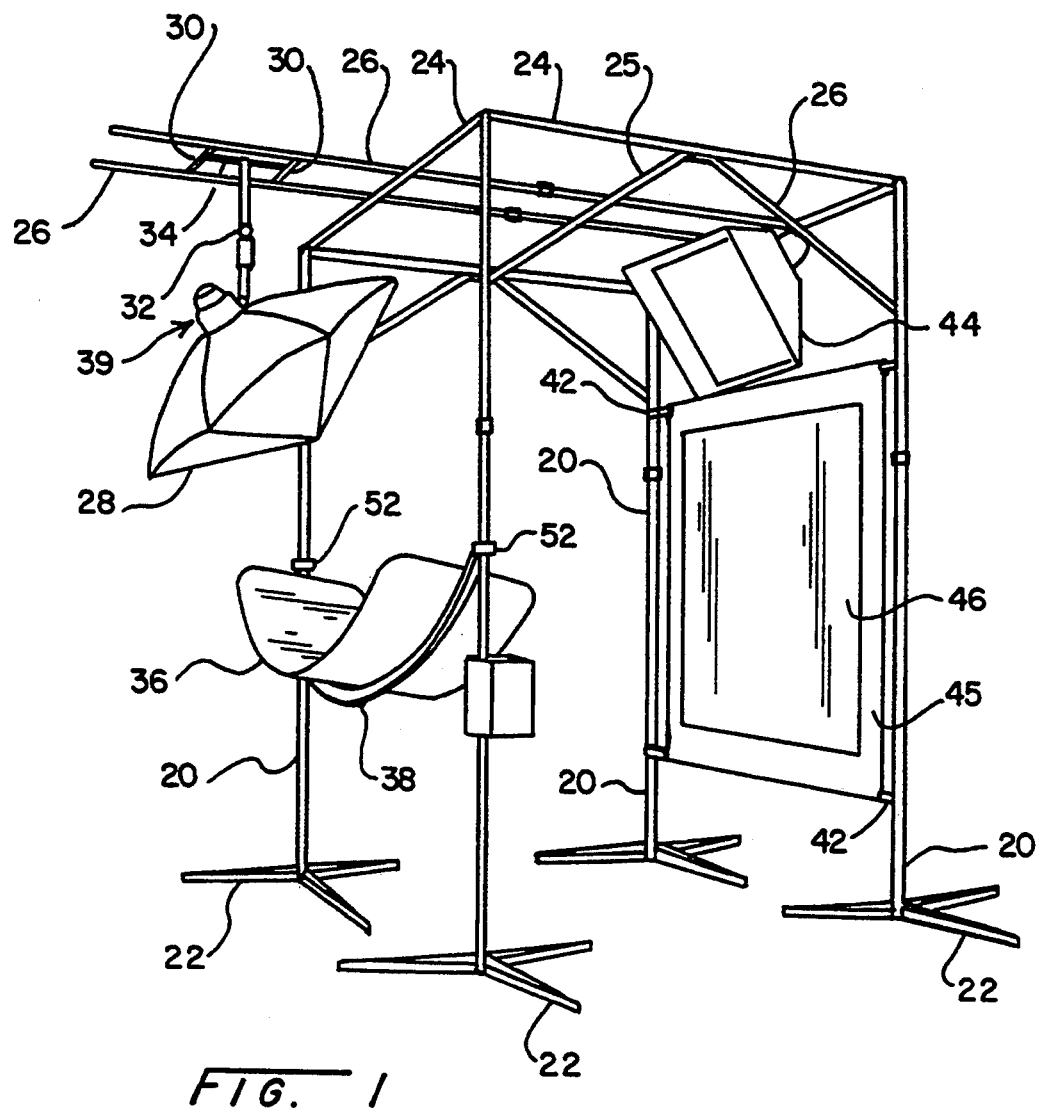
FIG. 1 is a perspective view illustrating a portable, demountable photography booth including a curved reflector assembly constructed in accordance with the present invention.
Figure 6:
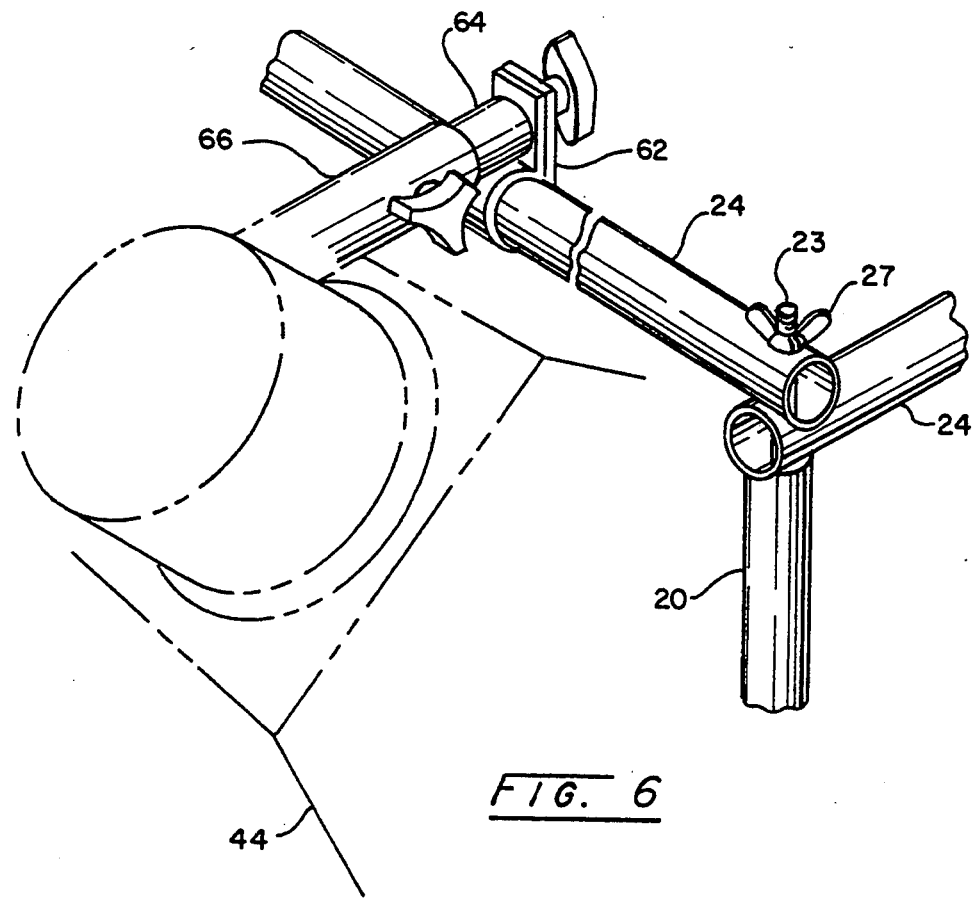
FIG. 6 is a partial perspective view of the booth assembly shown in FIG. 1 illustrating details of a preferred embodiment for assembling the vertical and horizontal frame elements on an optional rear primary light source.

A conveniently portable and demountable photography booth including a curved light reflector surface constructed in accordance with the present invention is shown in FIG. 1 and includes vertical frame elements 20 removably supported in a vertical disposition in a respective base 22. Preferably vertical frame elements 20 comprise suitable metal tubing and include a means for removably attaching horizontal, frame elements 24 at each corner of the rectangular frame formed as best seen in FIG. 6.

Frame elements 20 may be formed of multiple pieces telescoped together in any well-known conventional manner which permits them to be conveniently adjusted in length to adjust the height of the booth and for easy portability and storage. In the preferred embodiment shown, metal retaining straps 21 and 19, as seen in FIG. 6, employ threaded fasteners which can be tightened to effect frictional gripping of the respective sections comprising a vertical support 24 to permit the telescoping action to be releasably fixed at a desired position.

Horizontal frame elements 24 may be detachably mounted in any convenient conventional manner to vertical elements 20. As seen in FIG. 6, a preferred manner is to provide a pin or threaded shank 23 fixed to and extending parallel and outwardly from the upper end of each vertical element 20 which is adapted to extend through aligned holes provided near the ends of each frame element 24. In the case of a threaded shank, a wing nut 27 or the like may be employed to releasably fix the frame elements in their desired position.

Preferably the booth assembly includes inclined reinforcing corner braces, such as 25, which are detachably mounted between vertical frame elements 20 and horizontal frame elements 24 in any conventional manner. As seen in FIG. 5, a preferred arrangement includes a metal strap 29 received around a vertical element 20 and including a pair of legs provided with holes to accept a threaded fastener 31 which extends through the holes in the leg portion of strap 29 and a suitable hole in a corner brace 25. Tightening the fastener 31 to a bolt 33 effects frictional gripping of strap 29 to vertical element 20 and secures the end of corner brace 25. The opposite end of each brace 25 is similarly attached to one of the horizontal frame elements 24.

Figure 7:
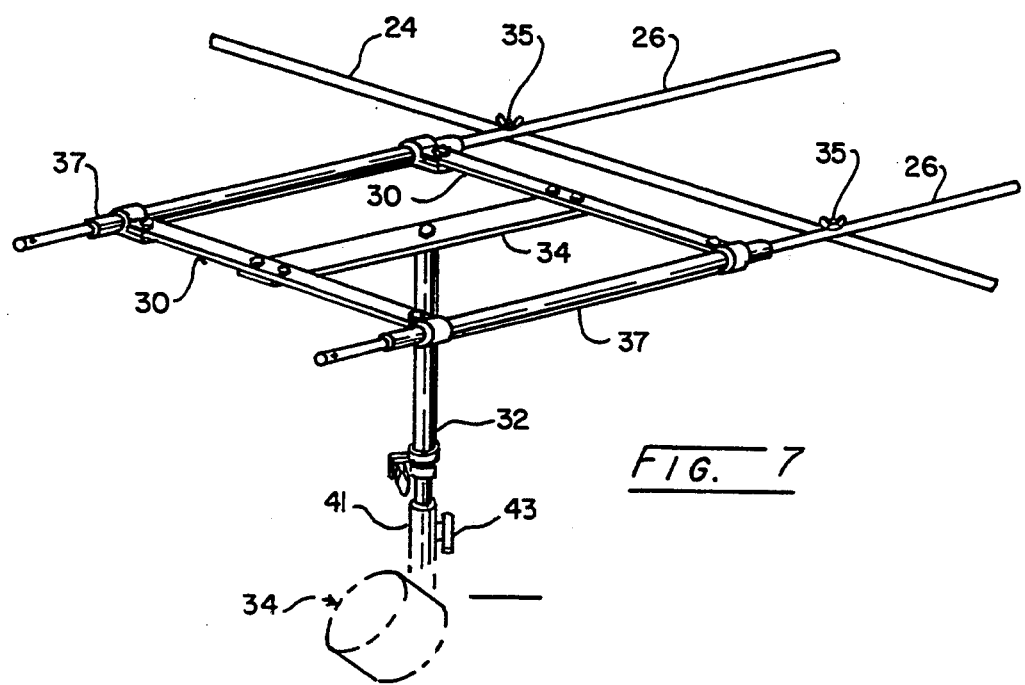
FIG. 7 is a partial perspective view of the booth assembly shown in FIG. 1 illustrating details of a preferred embodiment for attaching a front primary light source to the open frame elements of the booth assembly.

In the preferred embodiment shown in FIGS. 1 and 7, a pair of horizontal lamp support elements 26 are mounted over the top of horizontal frame elements 24 and are detachably mounted thereto via a wing nut 35 and a threaded fastener disposed through aligned holes in each element.

Lamp support rods 26 preferably are of sufficient length to extend outwardly of the main rectangular frame formed to accommodate positioning a frontal light source, such as a conventional umbrella type lamp 28, a short distance outside the rectangular frame.

To provide support for lamp 28, a pair of cross members 30 are attached to lamp support rods 26 and a rod-like, vertically disposed element 32 is fixed to a bar 34 connected between cross members 30. A convenient form for mounting support members 30 to lamp support rods 26 is provided by a pair of tubular members 37 fixed to each end of members 30 in any conventional manner such as metal strap and bolt combination similar to that as earlier described. The tubular members 37 are adapted to slideably receive the ends of support rods 26 so that the whole assembly is easily and quickly positioned as desired.

A conventional mounting bracket indicated generally at 39 is typically provided on conventional, commercially available umbrella type lamps and includes a tubular portion 41. Rod element 32 is adapted to be slideably received in tubular portion 41 and releasably fixed by a threaded fastener 43 which fictionally engages rod element 32. Preferably, rod 32 is provided with an indent adapted to receive the end of the fastener 43 to enhance the gripping function to more securely maintain the assembled relationship between elements 32 and 41.

A conventional lamp mounting bracket, such as 39, permits the lamp to be adjustably fixed through a wide choice of angular dispositions to permit the user to direct the light relative to the reflector surface and subject being photographed as deemed desirable.

As seen in FIGS. 1 and 6, a novel arcuate or curved light reflector 36 is mounted between the front pair of vertical frame elements 20 a predetermined distance from a point within the rectangular booth frame formed by vertical and horizontal frame elements 20 and 24. This point within the frame is the designated position of the subject to be photographed. More specifically, this designated position of the subject to be photographed is selected to position the subject's face at a distance from the midpoint of the curved reflecting surface of reflector 36 which is approximately equal to the radius of curvature of the reflecting surface which is designated as R in FIG. 4.

Reflector 36 may be positioned near the front of the booth frame in a separate mounting assembly, but preferably is mounted between the two forwardly disposed vertical frame elements 20 and is detachably connected thereto as seen in FIGS. 1 and 5.

Reflector 36 preferably comprises a generally rectangular sheet of flexible substrate material having at least one surface covered with a suitable reflective material, such as an embossed aluminum foil which is conventionally used in the photography industry to form light reflecting surfaces. One suitable reflective material is commercially available from the Photogenic Machine Corporation and sold under the trademark SILFOIL.

Employing a material, such as a conventional PVC plastic, in a thickness of 2 to 4 mm as a substrate provides a suitable degree of both strength and flexibility to permit the reflector to be made in a normally planar, generally rectangular configuration which can be flexed in a suitable supporting frame in the novel curved configuration shown in FIGS. 1 and 4 for operative use in taking photographs. This construction also lends itself to convenient transport with the remaining parts of the demountable frame assembly.

However, reflector 36 may also be rigidly formed in the desired curved configuration to provide the beneficial advantages to the photographic results described later herein without departing from the spirit of the present invention.

In the preferred embodiment shown in FIGS. 1, 4 and 5, reflector 36 is mounted to the forwardly disposed pair of vertical frame elements 20 by means of a reflector mounting assembly which includes curved support member 38 provided with attachment means at each end for connecting the support member 38 to opposing vertical frame elements 20 at a selected height, usually below the subject's face, and at a predetermined distance from the designated position of the subject. Lamp 28 is similarly spaced substantially the same distance from the midpoint of reflector 36 and the subject's face.

A preferred reflector mounting arrangement as seen in FIG. 5 includes curved support member 38 provided with a generally vertically extending flange 48 fixed to each end of support member 38. Flange 48 includes a hole or elongated slot adapted to receive a threaded fastener 50 mounted to a mounting block 52 and is releasably fixed thereto by threaded nut 60 provided with an enlarged knob for convenient manual manipulation.

Mounting block 52 preferably includes a central split hole 53 adapted to slideably receive a vertical support element 24 as shown in FIG. 5 and is adjustable in diameter by manipulation of integrally formed legs 54 separated by slot 56. A threaded fastener 57 extended through aligned threaded holes provided in each leg 54 to provide a convenient manner to selectively effect frictional engagement between with vertical element 20 and the hole 53 to releasably fix mounting block 52 at a selected, releasably fixed vertical position along frame element 20.

Preferably, curved support member 38 is constructed with the desired arcuate configuration which conforms with the radius of curvature which is selected for reflector 36 based upon the dimensions of the portable booth formed by frame elements 20 and 24 to provide an arrangement to take suitable facial or upper torso photographs in a relatively compact manner.

This is easily accomplished by constructing curved support member 38 with a circumferential length between the holes provided in reflector mounting flange 48 approximately equal to the planar length of reflector 36 so the upon mounting the reflector between opposing mounting flanges 48, flexible reflector 36 may be caused to assume the desired curved configuration forming a cylindrical segment having the selected radius of curvature for the particular dimensions accommodated by the selected position of the subject to be photographed.

In a preferred embodiment, one merely places each end of reflector 36 against the respective flange 48 and by pressing downwardly at one end, the flexible reflector can be resiliently made to conform to the curvature of support member 38 and releasably held between the ends thereof by the resilient bias force. However, other well-known conventional means for fixing the curved reflector in a frame or support can be employed without departing from the spirit of the invention.

Preferably, reflector support member 38 is mounted to permit pivotal adjustment of the angle of the reflector 36 relative to the horizontal to permit appropriate adjustment of the reflected image of reflector 36 in the eyes of the subject as more fully explained in the discussion of FIGS. 2 and 3 later herein. It has been found that a tilt of reflector 36 toward the subject of about 10 to 15 degrees from the horizontal provides very good results in most circumstances encountered for taking typical facial and upper torso photographs. This can be readily accomplished by tilting support member 38 toward the subject prior to tightening nut 60 to fix flange 48 and support 38 at the desired angular relationship.

The rectangular area of reflector 36 is selected relative to providing at least a sufficient amount of reflected light directed from below the subject face in accordance with conventional quality photographic practice. In a preferred embodiment of the present invention such as shown in FIGS. 1 and 4, a radius of curvature of about 30 inches has provided excellent results with a reflector having an arc length of about 58 to 60 inches and a height about one third the length or two-thirds of the radius of curvature. As indicated in FIG. 4 a 2 to 1 ratio between the circumferential length and the chosen radius of curvature is desirable to provide a reflected image approaching a significant curved configuration in the eye, however, a 20 percent deviation from this ratio also appears to work reasonably well. Preferably a reflected image in the eye approaching a semi-circle is deemed desirable.

Figure 2:
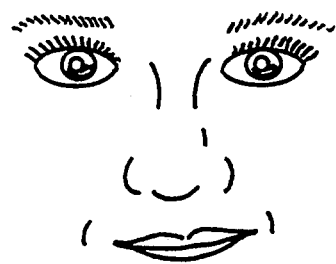
FIG. 2 is a diagrammatic view of a facial photograph illustrating the photographic result of the reflected light image appearing in the subject's eyes employing a curved reflector surface according to the present invention.
Figure 3:
FIG. 3 is a diagrammatic view similar to the view shown in FIG. 3 illustrating the typical photographic result of the reflected light image appearing in the subject's eye employing the prior art arrangement of multiple planar reflecting surface.

Now referring to FIGS. 2 and 3, FIG. 2 illustrates diagrammatically the results of employing the curved reflector 36 of the present invention as compared to the typical results shown in FIG. 3 using the conventional arrangement of three planar reflectors disposed in an angular relationship to one another to direct reflected light toward the subject's face.

In FIG. 3, three generally round focused dots appears in the pupil of the subject's eye below the larger round image representing the reflected image of the primary light source. The three smaller dots represent the reflection of each planar surface used in the prior art multiple, flat reflector arrangement. As seen in FIG. 2, the reflection of curved reflector 36 appears as a continuous curve in the pupil closely adjacent the lower boundary of the iris of the subject's eye and below the round reflected image of the primary light source. While very difficult to illustrate the actual appearance in the diagrammatic view of FIG. 2, the intensity of the curved reflection can be adjusted by adjusting the intensity of an appropriate light source 28 such that the curved reflection as seen in FIG. 2 appears more natural or attractive as to not require professional touch-up procedures such as is required to remove the smaller multiple round images illustrated in FIG. 3. In black and white "glamour" photos it may be desirable to have a rather high intensity level in the curved image. Whereas in color photographs, the intensity level may be adjusted lower to a point where the "curved image" merely appears to be an attractive natural highlight or lightening of the color of the pupil portion of the eye.

It should be noted that the radius of curvature of reflector 36 is selected to be approximately equal to a predetermined distance between a designated position of the user's face, and more specifically the user's eyes, and the midpoint of the surface of reflector 36. This relationship has been found to shape the reflected image of reflector 36 to closely approximate and conform to the natural curvature of the pupil and iris of the subject's eye so that the reflected curved image appears more attractive and natural. Further, this configuration assures a more uniform distribution of reflected light over the subject's face than is typically obtained using planar reflector arrangements.

"Approximately equal to the radius of curvature of reflector 36" is used herein in the context of aligning the reflected image of the curved reflector in the subject's eye so that the reflected image appears closely adjacent to and conforms to the curvature of the iris of the subject's eye. The amount this preferred radial distance varies from the radius of curvature of the reflector becomes less critical as the selected radius of curvature of reflector 36 becomes greater. For example, with a radius of curvature of about 30 inches, a deviation of about three to six inches in locating the subject's face relative to a distance equal to the chosen radius of curvature of the reflector does not appear to cause a visually undesirable appearance in the location of the reflected image in the subject's eyes. However, the closer one maintains the desired relationship, the more assurance one has of properly aligning the reflected image of reflector 36 in the eye of the subject to be photographed. In the above example, it is recommended that the deviation from the preferred relationship be less than about three inches to obtain good results and less than about two inches to obtain the best result. If the radius of curvature is significantly smaller, i.e. 10 to 15 inches, then a deviation from the radial distance as small as about two or three inches or so can undesireably affect the location of the reflected image in the subject's eye to the point of unacceptability.

The degree of tilt of reflector 36 relative to the horizontal tends to effect the thickness of the reflected image as well as the manner and amount of the reflected light directed onto the face of the subject from a position opposing the direct light source. Therefore as previously indicated, these two factors must be taken into consideration in setting the degree of horizontal tilt. As earlier noted herein an angle between about 10 to 15 degree relative to the horizontal has been found to provide very good results.

In a more preferred embodiment, a pair of horizontal rod members 42 are detachably mounted and disposed across the rearwardly disposed vertical frame elements 20 to carry a suitable background. The background may take the form of a sheet 45 of flexible material of a selected color and may conveniently include a through channel formed by overlapping and sewing the ends of the sheet material along opposing sides thereof.

A respective rod 42 may be inserted through a respective one of these channels and then the assembly conveniently attached to the rear pair of vertical frame elements 20 in any conventional manner.

In a more convenient arrangement, a backing sheet 45 and a separate sheet 46 of a specific color may be employed to form the background using releasable attaching means, to permit the user to change from one separate sheet 46 to another without removing rods 42 from their mounted position. VELCRO fastening means or another equivalent detachable fastening means function well for this purpose.

Additionally, another light source 44 may be detachably mounted to the rear of the booth frame in any conventional manner to provide overhead lighting from the rear of the subject as may be deemed desirable by the user. All that is required is a metal mounting strap 62 of similar construction to those previously described which may be fastened to a rear horizontal support 24. Strap 62 carries a rod 64 welded or otherwise fixed thereto which is adapted to slideably receive a tubular support 66 conventionally provided on commercially available photography lamp assemblies, such as shown at 68, in a nearly identical manner as earlier described herein relative to lamp 28. A threaded fastener 70 provides means to frictionally engage rod 64 within support 66 upon being tightened in a threaded hole provided in support 66.

To further enhance the convenience of taking high quality photographs, a conventional adjustable power output device is commercially available to operate conventional photography lamps and can be conveniently mounted on one of the vertical frame elements 20, if desired. Instructions for using such adjustable power outputs are well-known and can be supplied to the amateur or less experienced photographer along with complementary instructions for camera settings.

In view of the foregoing description, it should be understood the present invention provides an improved photography reflector arrangement which enhances the taking of quality photographs. When used in combination with the demountable booth assembly, the amateur and professional photographer is provided with the equivalent of a professional studio setting which also may be conveniently assembled and disassembled for transport or storage as may be desired.

I claim:

1. A photography lighting assembly for taking photographs of the upper torso and face of a human or animal subject comprising in combination;

a) a light reflecting surface defining a cylindrical segment having an arc length greater than its height, said cylindrical segment generated about a selected radius approximately equal to a distance measured between the midpoint of said curved reflecting surface and a predetermined position for locating the face of the subject to be photographed, said reflecting surface being inclined toward the predetermined position of said subject's face at a selected angle relative to the horizontal;

b) a light source disposed in vertically spaced relationship to said reflecting surface at a distance approximately equal to the selected radius of curvature of said reflecting surface and at approximately the same distance from the face of the subject to be photographed.

2. The lighting assembly defined in claim 1 wherein said light reflecting surface comprises a sheet of resilient material normally in a planar condition and including a reflector support, said reflecting surface being releasably mounted to said reflector support in a continuously curved configuration along its length to form said cylindrical segment.

3. The lighting assembly defined in claim 1 wherein said curved reflected surface is inclined relative to the horizontal at a selected angle between about 10 to 15 degrees.

4. The lighting assembly defined in claim 2 wherein said reflecting surface comprises a planar substrate having at least one side coated with a light reflective material.

5. A portable photography booth comprising, in combination;
   a) a plurality of vertical frame elements, each releasably fixed to a portable base to define four corners of an open frame;
   b) a plurality of horizontal frame elements, at least a different one being releasably connected between opposing pairs of said vertical frame elements to define an upper portion of said open frame;
   c) a pair of light source support elements releasably fixed across opposing horizontal frame elements and including a forwardly extending light source attachment disposed outwardly of said open frame;
   d) a reflector assembly disposed adjacent to and between an opposing pair of said vertical frame elements and including a support member and a concave light reflecting surface mounted to said support member and tilted toward the rear of said open frame at a preselected angle, said reflecting surface defining a generally cylindrical segment having an arc length dimension greater than its height dimension and disposed with its length dimension extending in a horizontal direction, said cylindrical segment having a radius of curvature selected to be approximately equal to a distance measured from the midpoint of said reflecting surface to a selected point within said open frame designated for the position of the face of a subject to be photographed; and
   e) a conventional light source releasably connected to said light source attachment and directed toward said open frame in vertically opposing relationship to the position of said reflecting surface.

6. The portable photography booth defined in claim 5 wherein said reflecting surface comprises a resilient material normally having a planar configuration which is releasably fixed to said support member in a curved configuration defining said cylindrical segment.

7. A light reflector for providing indirect photography lighting from a light source to the upper torso and face of a human or animal subject and a unique reflected image in the eyes of the subject comprising a continuously curved concave reflecting surface defining a cylindrical segment having a radius of curvature selected to be approximately equal to a distance measured between the midpoint of said reflective surface and a designated position for the subject to be photographed; said cylindrical segment having an arcuate length dimension extending in a horizontal direction relative to said subject greater than its height dimension for forming an arcuate reflected image in a preselected position in the eyes of said subject.

8. The light reflector defined in claim 7 wherein said reflecting surface comprises a resilient substrate provided with a coating of a light reflective material, said substrate having a normally planar configuration and releasably mounted in a supporting holder in a curved configuration defining said cylindrical segment.

9. An improved method for arranging lighting for taking facial and upper torso photographs of a human or animal subject to provide a unique highlight reflection adjacent to the iris of the subject's eyes comprising the steps of:
   a) providing a conventional primary light source disposed at a predetermined distance in front and above the subject to be photographed;
   b) disposing a concave curved light reflecting surface, defining a cylindrical segment having an arcuate length greater than its height, below said primary light source to direct reflected light upwardly upon the subject to be photographed with its arcuate length dimension extended in a horizontal direction relative to said subject, and at a distance from the subject measured from the midpoint between the subject's eyes to the midpoint of said curved reflecting surface approximately equal to the radius of curvature of said cylindrical segment to align a curved reflected image of said reflecting surface closely adjacent and generally conforming to a portion of the circumference of the iris of the subject's eyes.

10. The light reflector defined in claim 7 wherein said arcuate length dimension is equal to about two times said radius of curvature and said height dimension is equal to about two-thirds of said radius of curvature.

11. The lighting assembly defined in claim 1 wherein said arc length of said cylindrical segment is about two times said radius of curvation and said height of said cylindrical segment is about one third of said arc length.

* * * * *